United States Patent
Anzo et al.

(10) Patent No.: US 10,154,100 B2
(45) Date of Patent: Dec. 11, 2018

(54) NIC TEAMING PAIR CONFIGURATION

(71) Applicant: Lenovo Enterprise Solutions (Singapore) PTE. LTD., New Tech Park (SG)

(72) Inventors: Keisuke Anzo, Yokohama (JP); Yoshiroh Shimada, Yamato (JP)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 184 days.

(21) Appl. No.: 15/191,199

(22) Filed: Jun. 23, 2016

(65) Prior Publication Data

US 2017/0374160 A1   Dec. 28, 2017

(51) Int. Cl.
*H04L 12/24* (2006.01)
*H04L 29/08* (2006.01)

(52) U.S. Cl.
CPC .............. *H04L 67/16* (2013.01); *H04L 41/12* (2013.01)

(58) Field of Classification Search
CPC ...................................................... H04L 67/16
USPC ......................................................... 370/329
See application file for complete search history.

(56) References Cited

U.S. PATENT DOCUMENTS

2008/0043000 A1\* 2/2008 Currid ..................... G06F 21/73
                                                                345/179

OTHER PUBLICATIONS

Finn, A., "Windows Server 2012 NIC Teaming and Multichannel", online <http://www.aidanfinn.com/?p=12924>, Jun. 19, 2012, 9 pp.
O'Shea, M., "SMB Multichannel and NIC Teaming—When and Where Would You Use Each?", online <https://blogs.technet.microsoft.com/ausoemteam/2015/03/21/smb-multichannel-and-nic-teamingwhen-and-where-would-you-use-each/>, Mar. 21, 2015, 4 pp.
Barreto, J., "The basics of SMB Multichannel, a feature of Windows Server 2012 and SMB 3.0", online <https://blogs.technet.microsoft.com/josebda/2012/06/28/the-basics-of-smb-multichannel-a-feature-of-windows-server-2012-and-smb-3-0/>, Jun. 28, 2012, 13 pp.
Onisick, J., "UCS Server Failover", online <http://www.definethecloud.net/ucs-server-failover/>, Jun. 12, 2010, 11 pp.
"Windows Server 2012 NIC Teaming (LBFO) Deployment and Management", online <https://www.microsoft.com/en-us/download/details.aspx?id=30160>, Jun. 27, 2012, 41 pp.

(Continued)

*Primary Examiner* — Shripal K Khajuria
(74) *Attorney, Agent, or Firm* — Jason Friday (57) ABSTRACT

A computing device has one or more network interface controllers (NICs). Each NIC has ports and controllers. Each port of each NIC is managed by one of the controllers of the NIC. The computing device has one or more input/output modules (IOMs). Each port of each NIC is connected to one of the IOMs. Candidate ports with which to establish a NIC teaming pair are determined for a target port, based on addresses of the ports. A selected candidate port from the candidate ports is determined, based on a priority score of each candidate port calculated based on the IOM to which the candidate port is connected, the NIC to which the candidate port is a part, and the controller that manages the candidate port. The target port is configured with the selected candidate port as the NIC teaming pair.

17 Claims, 7 Drawing Sheets

(56) References Cited

OTHER PUBLICATIONS

"HP Integrity Servers with Microsoft® Windows Server™ 2003 and Windows Server™ 2008 HP Integrity Network Adapter Teaming", Hewlett-Packard White Paper, Sep. 2008, 105 pp.

Renato, M., "How to Configure NIC Teaming on HP Proliant Server using HP NCU", online <http://www.serverhead.com/configure-nic-teaming-hp-server-ncu>, May 16, 2014, 7 pp.

"Dell PowerEdge VRTX Networking: VRTX I/O Module Basic Configuration, Use and Troubleshooting Version 1.4", Dell Networking Solutions Engineering, Dec. 2014, 30 pp.

BladeCenter Virtual Fabric 10Gb Switch Module Installation Guide, Lenovo, May 2015, 62 pp.

\* cited by examiner

FIG 3

| PFA | NIC | CONTROLLER | PORT | IOM | SCORE TO PORT 1 | SCORE TO PORT 2 |
|---|---|---|---|---|---|---|
| 17:00:00 | 1 | 1 | 1 | 1 | N/A | N/A |
| 17:00:01 | 1 | 1 | 2 | 2 | N/A | N/A |
| 22:00:00 | 1 | 2 | 3 | 1 | 1 | 4 |
| 22:00:01 | 1 | 2 | 4 | 2 | 4 | 1 |

| PFA | NIC | CONTROLLER | PORT | IOM | SCORE TO PORT 1 | SCORE TO PORT 2 | SCORE TO PORT 3 | SCORE TO PORT 4 |
|---|---|---|---|---|---|---|---|---|
| 17:00:00 | 1 | 1 | 1 | 1 | N/A | N/A | N/A | N/A |
| 17:00:01 | 1 | 1 | 2 | 2 | N/A | N/A | N/A | N/A |
| 22:00:00 | 1 | 2 | 3 | 1 | N/A | N/A | N/A | N/A |
| 22:00:01 | 1 | 2 | 4 | 2 | 6 | 6 | N/A | N/A |
| 27:00:00 | 2 | 3 | 5 | 3 | 6 | 6 | N/A | N/A |
| 27:00:01 | 2 | 3 | 6 | 4 | N/A | N/A | N/A | N/A |
| 32:00:00 | 2 | 4 | 7 | 3 | N/A | N/A | 6 | 6 |
| 32:00:01 | 2 | 4 | 8 | 4 | N/A | N/A | 6 | 6 |

| PFA | NIC | CONTROLLER | PORT | IOM | SCORE TO PORT 1 | SCORE TO PORT 2 |
|---|---|---|---|---|---|---|
| 17:00:00 | 1 | 1 | 1 | 1 | N/A | N/A |
| 17:00:01 | 1 | 1 | 2 | 2 | N/A | N/A |
| 22:00:00 | 1 | 2 | 3 | 1 | N/A | N/A |
| 22:00:01 | 1 | 2 | 4 | 2 | N/A | N/A |
| 27:00:00 | 2 | 3 | 5 | 3 | N/A | N/A |
| 27:00:01 | 2 | 3 | 6 | 4 | N/A | N/A |
| 32:00:00 | 2 | 4 | 7 | 3 | N/A | N/A |
| 32:00:01 | 2 | 4 | 8 | 4 | N/A | N/A |
| 37:00:00 | 3 | 5 | 9 | 1 | 3 | 6 |
| 37:00:01 | 3 | 5 | 10 | 2 | 6 | 3 |
| 42:00:00 | 3 | 6 | 11 | 1 | N/A | N/A |
| 42:00:01 | 3 | 6 | 12 | 2 | N/A | N/A |
| 47:00:00 | 4 | 7 | 13 | 3 | N/A | N/A |
| 47:00:01 | 4 | 7 | 14 | 4 | N/A | N/A |
| 52:00:00 | 4 | 8 | 15 | 3 | N/A | N/A |
| 52:00:01 | 4 | 8 | 16 | 4 | N/A | N/A |

NIC TEAMING PAIR CONFIGURATION

BACKGROUND

Computing devices, such as server computing devices like blade servers, can include network interface controllers (NICs) by which to connect to networks, including the Internet. While a computing device intended for usage by an end user typically has a NIC with just one network port, a server computing device usually has one or more NICs that each can have one or more network ports. Having multiple network ports over one or more NICs permits the server computing device to connect to a network over multiple paths, providing redundancy.

SUMMARY

An example method includes determining, by a computing device for a target port of a number of network ports of the computing device, candidate ports of the network ports with which to establish a network interface controller (NIC) teaming pair, based on addresses of the network ports. The method includes determining, by the computing device for the target port, a selected candidate port with which to establish the NIC teaming pair, from the candidate ports, based on a priority score of each candidate port calculated based on the address of the candidate port. The method includes configuring, by the computing device, the target port with the selected candidate port as the NIC teaming pair, network communication subsequently occurring over the target port and the selected candidate port as the NIC teaming pair.

An example computing device includes one or more NICs. Each NIC has network ports. The computing device includes a processor, and a non-transitory computer-readable data storage medium storing computer-executable code. The code is executable by the processor to realize candidate determination logic to, for a target port of the network ports of the NICs, determine a plurality of candidate ports of the network ports of the NICs with which to establish a NIC teaming pair, based on addresses of the network ports. The code is executable by the processor to realize candidate selection logic to, for the target port, choose a selected candidate port with which to establish the NIC teaming pair, from the candidate ports, based on a priority score of each candidate port calculated based on the address of the candidate port. The code is executable by the processor to realize NIC teaming configuration logic to configure the target port with the selected candidate port as the NIC teaming pair.

An example non-transitory computer-readable data storage medium stores computer-executable code executable by a computing device to perform a method. The method includes determining, for a target port of a number of ports of one or more NICs of the computing device, a plurality of number ports of the ports with which to establish a NIC teaming pair. Each candidate port has a target bus number equal to a bus number of the target port plus a multiple of a number of the NICs. The computing device has one or more IOMs to which the NICs are externally exposed. Each NIC has a number of controllers. Each port of each NIC is managed by one of the controllers of the NIC and is connected to one of the IOMs of the computing device. The method includes determining, by the computing device for the target port, a selected candidate port with which to establish the NIC teaming pair, from the candidate ports, based on a priority score of each candidate port. The priority score of each candidate port is calculated based on the IOM to which the candidate port is connected, the NIC of which the candidate port is a part, and the controller that manages the candidate port. The priority scores prioritize redundancy in determination of the selected candidate port at an IOM level over a NIC level, and at the NIC level over a controller level. The method includes configuring, by the computing device, the target port with the selected candidate port as the NIC teaming pair, network communication subsequently occurring over the target port and the selected candidate port as the NIC teaming pair.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a server computing device like a blade server typically has more than one network port over one or more network interface cards (NICs) for redundancy. One way by which such multiple network ports can be configured for purposes of redundancy is known as NIC teaming. NIC teaming permits multiple network ports to be "teamed" together for bandwidth aggregation, and/or for network traffic failover to maintain connectivity to a network in the case of network component failure.

Configuring the network ports of a computing device as NIC teams, however, is a laborious process. Furthermore, if configured incorrectly, the NIC teams may not efficiently utilize the available network ports, such that the number of teams configured may be less than the maximum possible, and may not provide the level of redundancy expected. For example, a network port may be configured as part of a NIC team with another network port that shares the same network component that is more susceptible to failure than another network component is. This means that there is a greater likelihood that network connectivity will be lost in the case of such failure, as compared to if two network ports were configured as part of a NIC team that did not share this same network component.

Techniques disclosed herein overcome this and other shortcomings. To efficiently utilize the available network ports of a computing device, a number of candidate ports with which to configure a target port as a NIC team are selected based on addresses of the ports, such as the ports peripheral component interconnect (PCI) function addresses (PFAs). The PFA of a port includes a bus number of the NIC of which the port is a part, a device number of the NIC of which the port is a part, and a function number of a controller, like an application-specific integrated circuit (ASIC), that manages the port. Limiting the number of possible ports from which to select a port to configure a NIC team with a target port helps ensure that the maximum number of ports will be able to be configured as NIC teams.

Furthermore, of the candidate ports that have been determined for a target port, a selected candidate port is chosen based on priority scores of the candidate ports. The priority score of each candidate port is calculated based on the IOM to which the port is connected, the NIC of which the candidate port is a part, and the controller, like the ASIC, that manages the candidate port. The priority scores can prioritize redundancy at an IOM level over a NIC level, and at a NIC level over a controller level, in determining the selected candidate port. There are fewer IOMs in a computing device than NICs, and in turn there are fewer NICs than controllers. Thus, the techniques disclosed herein optimize hardware redundancy when selected a candidate port from the candidate ports that have been determined, for pairing with the target port as a NIC team.

Figure 1:
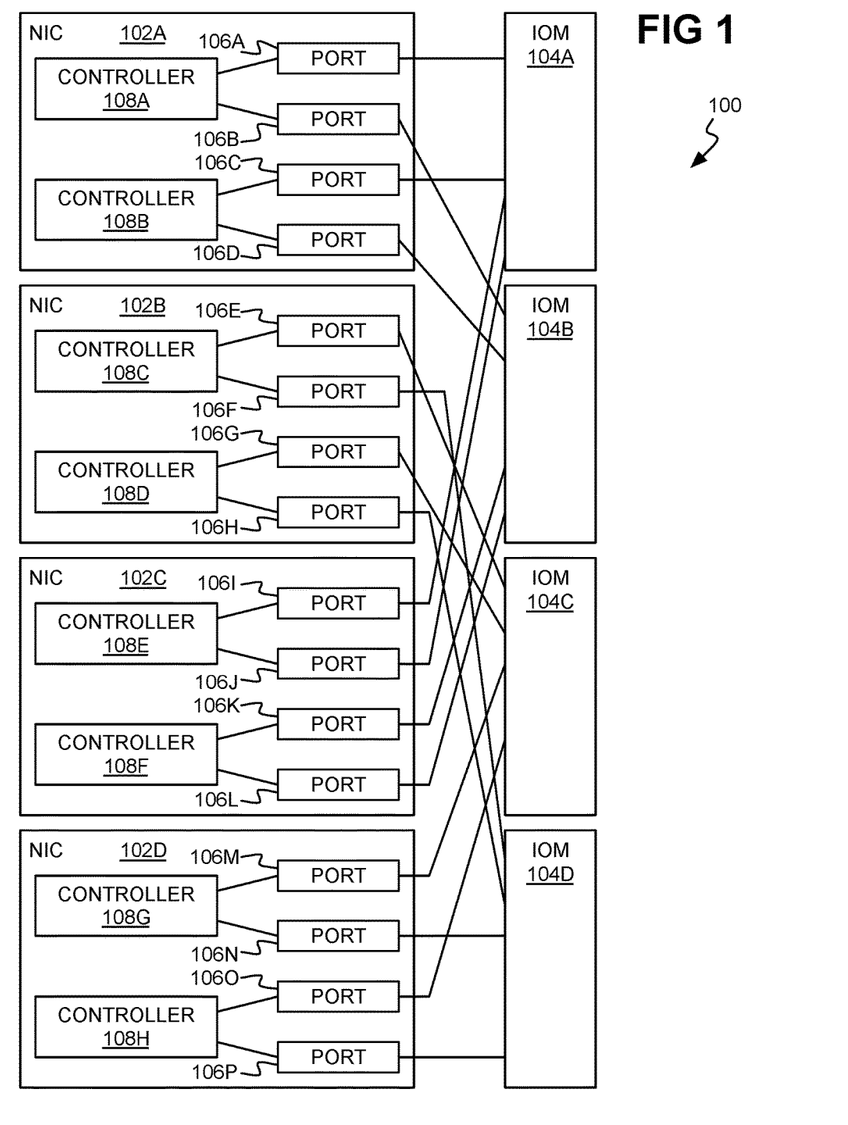
FIG. 1 is a diagram of an example computing device having network ports that can be configured as network interface controller (NIC) teaming pairs.

FIG. 1 shows an example computing device 100, such as a server like a blade server. A blade server is a particular type of server. Specifically, a server chassis housing or enclosure may be mounted in a server rack. The chassis can hold a number of blade servers, each of which is a self-contained server. Having multiple blade servers within such an enclosure efficiently maximizes space within a server room.

The computing device 100 in the example of FIG. 1 includes four NICs 102A, 102B, 102C, and 102D, collectively referred to as the NICs 102. There may be more or fewer NICs 102, however. The NICs 102A and 102B may be network cards inserted into corresponding slots of a primary logic board of the computing device 100, whereas the NICs 102C and 102D may be network cards inserted into corresponding slots of a logic board of an expansion node or module for the computing device 100. A NIC 102 is a circuit board or card that is inserted into the computing device 100 so that the computing device 100 can be connected to a network.

Each NIC 102 in the example of FIG. 1 includes four network ports 106, which include ports 106A, 106B, 106C, 106D, 106E, 106F, 106G, 106H, 106I, 106J, 106K, 106L, 106M, 106N, 106O, and 106P. The NIC 102A includes ports 106A, 106B, 106C, and 106D. The NIC 102B includes ports 106E, 106F, 106G, and 106H. The NIC 102C includes ports 106I, 106J, 106K, and 106L. The NIC 102D includes ports 106M, 106N, 106O, and 106P. There may be more or fewer ports 106 in each NIC 102, however. A network port 106 is a physical network interface by which the computing device 100 can be connected to a network, and can include a physical jack receptive to a corresponding physical plug.

Each NIC 102 in the example of FIG. 1 includes two controllers 108, which may be ASICs, and which include controllers 108A, 108B, 108C, 108D, 108E, 108F, 108G, and 108H. The NIC 102A has controllers 108A and 108B; the NIC 102B has the controllers 108C and 108D; the NIC 102C has the controllers 108E and 108F; and the NIC 102D has the controllers 108G and 108H. There may be more or fewer controllers 108 in each NIC 102, however.

Each controller 108 of each NIC 102 manages two ports 106 of the NIC 102. That is, each controller 108 of each NIC 102 includes the circuitry by which data can be sent and received over a network via the two ports 106 that the controller 108 manages. The controller 108A of the NIC 102A manages the ports 106A and 106B; the controller 108B of the NIC 102A manages the ports 106C and 106D; the controller 108C of the NIC 102B manages the ports 106E and 106F; and the controller 108D of the NIC 102B manages the ports 106G and 106H. The controller 108E of the NIC 102C manages the ports 106I and 106J; the controller 108F of the NIC 102C manages the ports 106K and 106L; the controller 108G of the NIC 102D manages the ports 106M and 106N; and the controller 108H of the NIC 102D manages the ports 106O and 106P.

The computing device 100 in the example of FIG. 1 includes four IOMs 104A, 104B, 104C, and 104D, collectively referred to as the IOMs 104. There may be more or fewer IOMs 104, however. The IOMs 104 externally expose the ports 106 outside the computing device 100, by which the ports 106 can then be connected to external networking devices, such as external switches, and so on. The IOMs 104 may be network switch modules of the computing device 100, or simply pass-through modules of the device 100.

Each port 106 of each NIC 102 is connected to one of the IOMs 104. For example, if a port 106 includes a physical jack, a plug at one end of a network cable may be inserted into the jack of the port 106, and a plug at the other end of the network cable may be inserted into a corresponding jack of an IOM 104. In another implementation, each port 106 may be hardwired via conductive traces, and so on, to a corresponding IOM 104. Each IOM 104 may also include jacks that are externally accessible from the computing device 100, so that the IOMs 104 can be connected to other networking hardware for connecting to a network, via network cables.

The IOM 104A is connected to the ports 106A and 106C of the NIC 102A and to the ports 106I and 106K of the NIC 102C. The IOM 104B is connected to the ports 106B and 106D of the NIC 102B and to the ports 106J and 106L of the NIC 102C. The IOM 104C is connected to the ports 106E and 106G of the NIC 102B and to the ports 106M and 106O of the NIC 102D. The IOM 104D is connected to the ports 106F and 106H of the NIC 102B and to the ports 106N and 106P of the NIC 102D.

Each port 106 has a unique network address, such as a PFA. The PFA of a port 106, as noted above, includes a bus number of the NIC 102 of which the port 106 is a part, a device number of the NIC 102 of which the port 106 is a part, and a function number of the controller 108 that manages the port. The PFA of a port 106 can be expressed in the nomenclature X:Y:Z, where X is the bus number, Y is the device number, and Z is the function number.

Figure 2A:
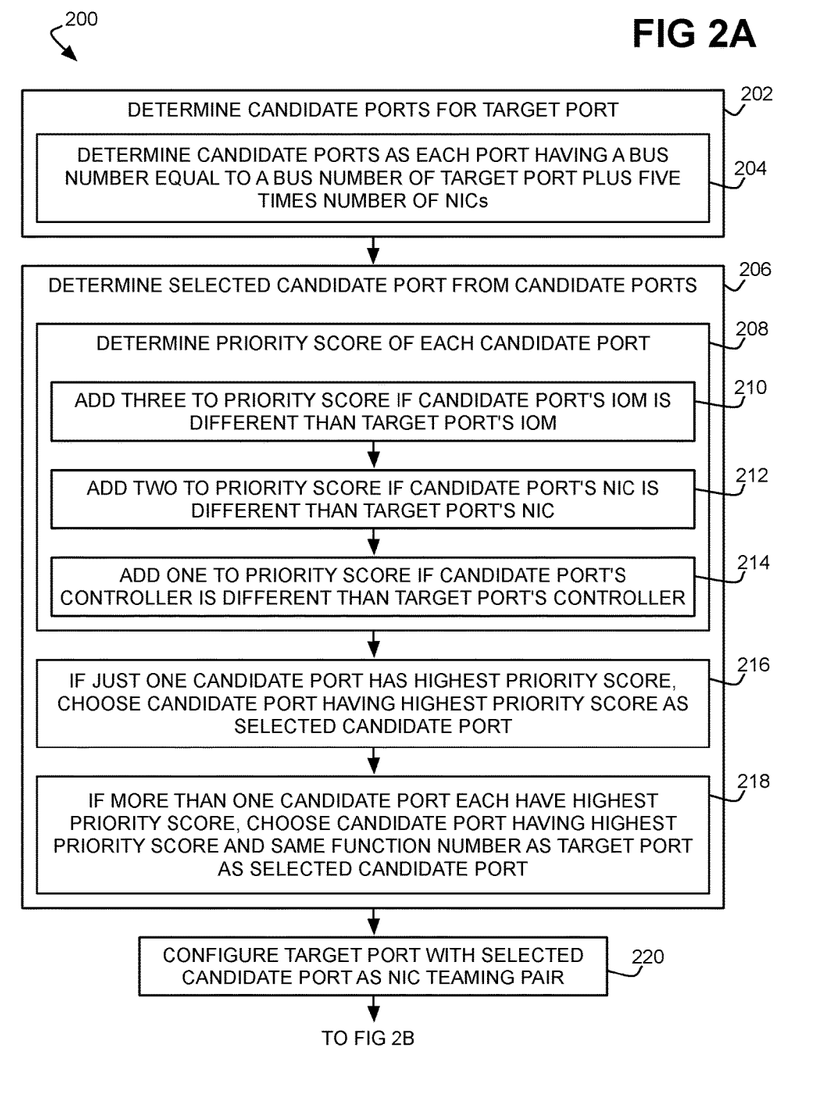
FIGS. 2A and 2B are flowcharts of an example method for selecting a port to configure as a NIC teaming pair with a target port.
Figure 2B:
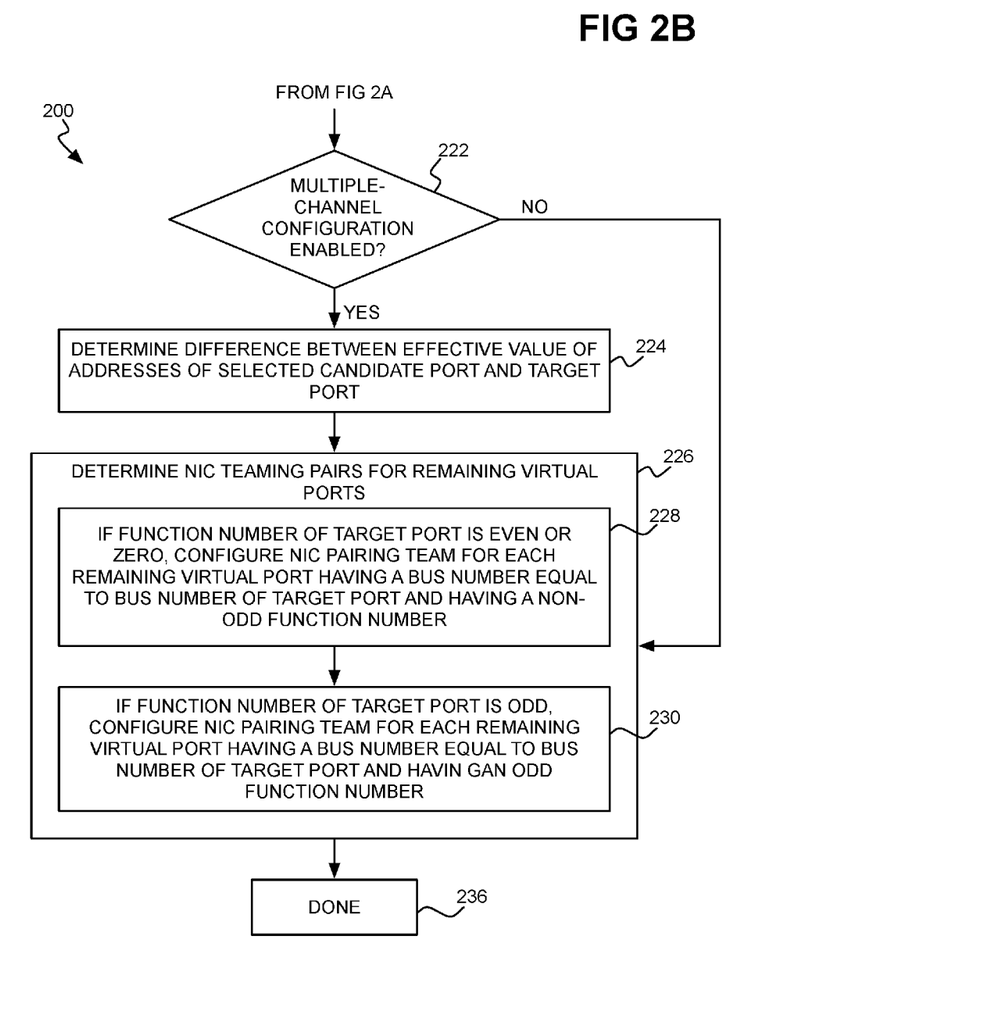

FIGS. 2A and 2B show an example method 200 for determining, for a target port, another port with which to configure the target port as a NIC teaming pair, and for configuring the two ports as the NIC teaming pair. A computing device, such as a server like a blade server, of which the ports are a part can perform the method 200. For example, the operating system of the computing device can perform the method 200. The method 200 can be performed for each port of the computing device that is desired to be teamed with another port as a NIC teaming pair. The method 200 can be implemented as computer-executable code stored on a non-transitory computer-readable data storage medium, which is then executed by the computing device.

Referring first to FIG. 2A, the computing device determines the candidate ports for the target port (202), from the ports (other than the target port) of the computing device. For example, the computing device can determine the candidate ports as each port of the computing device that has a bus number equal to the bus number of the target port, plus five times the number of NICs of the computing device (204). More generally, the computing device can select each port that has a bus number equal to the bus number of the target port plus a multiple of the number of NICs, as a candidate port. Selecting the candidate ports in this manner can ensure that the maximum number of NIC teaming pairs can be established within the computing device.

The computing device then determines a selected candidate port from the candidate ports that have been determined (206). The computing device can determine the priority score of each candidate port (208) to prioritize IOM redundancy between the selected candidate port and the target port over NIC redundancy between the two ports, and to prioritize NIC redundancy over controller redundancy between the two ports. For instance, A value of three, or another first value, is added to the priority score of a candidate port if its IOM is different than the target port's IOM (210). A value of two, or another second value less than the first value, is added to the priority score of a candidate port if its NIC is different than the target port's NIC (212). A value of one, or another third value less than the second value, is added to the priority score of a candidate port if its controller is different than the target port's controller (214).

If just one candidate port has a highest priority score of any candidate port, then the computing device chooses the candidate port having this highest priority score as the selected candidate port (216). If more than one candidate port each have the highest priority score—that is, if more than one candidate port is tied for highest priority by their scores—then the computing device chooses the candidate port having the highest priority score that has the same function number as the target port, as the selected candidate port (218). Choosing the candidate port having the highest priority score that has the same function number in its PFA as the target port also can ensure that the maximum number of NIC teaming pairs can be established within the computing device.

The computing device configures the target port together with the selected candidate port as a NIC teaming pair (220). For instance, the computing device can appropriately set configuration settings of the device driver and/or firmware of the NIC(s) of the two ports, and/or configuration settings of the operating system (OS) running on the computing device. Network communication subsequently occurs over the target port and the selected candidate port in accordance with their configuration as a NIC teaming pair. The network administrator or other user is thus freed from having to choose the selected candidate port and from having to configure the NIC teaming pair him or herself. The optimal candidate port is selected to ensure maximum redundancy and so that the maximum number of NIC teaming pairs can be established.

Next, referring to FIG. 2B, a network administrator or other user may have specified that a multiple-channel configuration be enabled. NIC teaming—i.e., physical NIC aggregation—provides for network port failover and load balancing. Thus, if one port of the NIC teaming pair fails, the other port can be used, which is failover. Furthermore, network traffic of multiple network streams can be divided by network stream over the two ports, which is load balancing. By comparison, multiple-channel, or multichannel, such as server message block (SMB) multichannel, divides a physical port into multiple virtual ports, which can then be used assigned among different virtual machines (VMs) and so on.

If a multiple-channel configuration has been enabled (222), then a difference between the effective value of the address of the selected candidate port and the effective value of the address of the target port of the NIC teaming pair configured in part 220 is determined (224). For example, if the PFA of the target port is 17:00:00 and the PFA of the selected candidate port is 22:00:01, the difference between the effective value of the latter (220001, with the colons that separate the bus, device, and function numbers of the PFA removed) and the effective value of the former (170000) is 50001. As another example if the PFA of the target port is 17:00:01 and the PFA of the selected candidate port is 22:00:00, the difference between the effective value of the latter (220000) and the effective value of the former (170001) is 49999.

The NIC teaming pairs for the remaining virtual ports are then determined (226). If the target port for which parts 202 through 220 have just been performed has a function number that is not odd, then each remaining virtual port having a function number that is also not odd and that has a same bus number as the target port is configured within a NIC teaming pair (228). Specifically, each such virtual port can be paired within a NIC teaming pair with a virtual port having an address equal to the effective value of the former virtual port's address plus the difference determined in part 224. If the target port for which parts 202 through 220 have just been performed has a function number that is odd, then each remaining virtual port having a function number that is also odd and that has a same bus name as the target port is configured within a NIC teaming pair (230). Specifically, each such virtual port can be paired within a NIC teaming pair with a virtual port having an address equal to the effective value of the former virtual port's address plus the difference determined in part 224. The method 200 is then finished (230).

For example, if the target port has the PFA 17:00:00, and the difference determined in part 224 is 50001, then the remaining virtual ports having PFAs 17:00:02, 17:00:04, and 17:00:06, are paired within NIC teaming pairs with virtual ports having PFAs 22:00:03, 22:00:05, and 22:00:07, respectively. This is because 170002 plus 50001 equals 220003; 170004 plus 50001 equals 220005; and 170006 plus 50001 equals 220007. As another example, if the target port has the PFA 17:00:01, and the difference determined in part 224 is 49999, then the remaining virtual ports having PFAs 17:00:03, 17:00:05, and 17:00:07, are paired within NIC teaming pairs with virtual ports having PFAs 22:00:02, 22:00:04, and 22:00:06, respectively. This is because 170003 plus 49999 equals 220002; 170005 plus 49999 equals 220004; and 170007 plus 49999 equals 220006.

Figure 3:
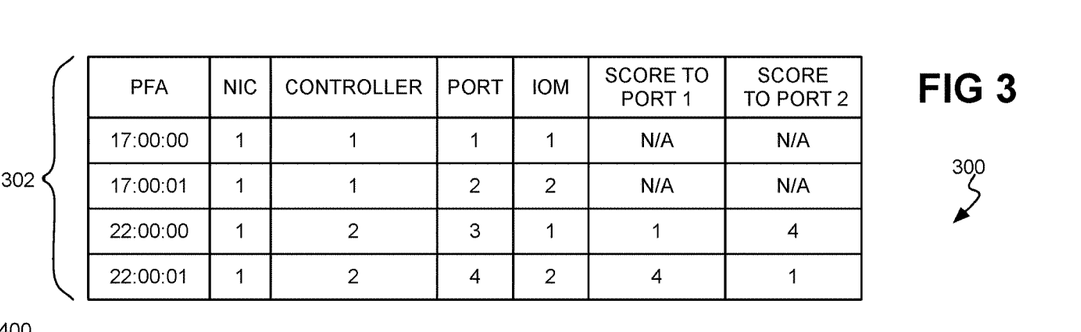
FIGS. 3, 4, 5, and 6 are diagrams of tables depicting example performance of the method of FIGS. 2A and 2B in relation to computing devices having differing numbers of input/output modules (IOMs), NICs, controllers, and ports.

FIG. 3 shows a table 300 illustrative of example performance of parts 202 and 206 of the method 200 in relation to a computing device having two IOMs and one NIC with four ports and two controllers. The rows 302 of the table 300 correspond to the four ports, which are numbered 1, 2, 3, and 4. Two NIC teaming pairs are desired to be configured, one including port 1, and another including port 2. The candidate ports for each of ports 1 and 2 are ports 3 and 4, because they have a PFA bus number of 22, which is equal to the PFA bus number of 17 of ports 1 and 2 plus five times the number of NICs (one) in the computing device.

In relation to port 1 as the target port, the priority score of port 3 is one, because they share the same IOM and the same NIC but have different controllers, so when performing parts 210, 212, and 214, just one is added in part 214. In relation to part 1 as the target port, the priority score of port 4 is four, because they have different IOMs and different controllers and have the same NIC, so when performing parts 210, 212, and 214, three is added in part 210 and one is added in part 214. Therefore, port 4 is the selected candidate port for port 1, with which to configure a NIC teaming pair.

In relation to port 2 as the target port, the priority score of port 3 is four, because they have different IOMs and different controllers and have the same NIC, so when performing parts 210, 212, and 214, three is added in part 210 and one is added in part 214. In relation to port 2 as the target port, the priority score of port 4 is one, because they share the same IOM and the same NIC but have different controllers, so when performing parts 210, 212, and 214, just one is added in part 214. Therefore, port 3 is the selected candidate port for port 2, with which to configure a NIC teaming pair.

Figure 4:
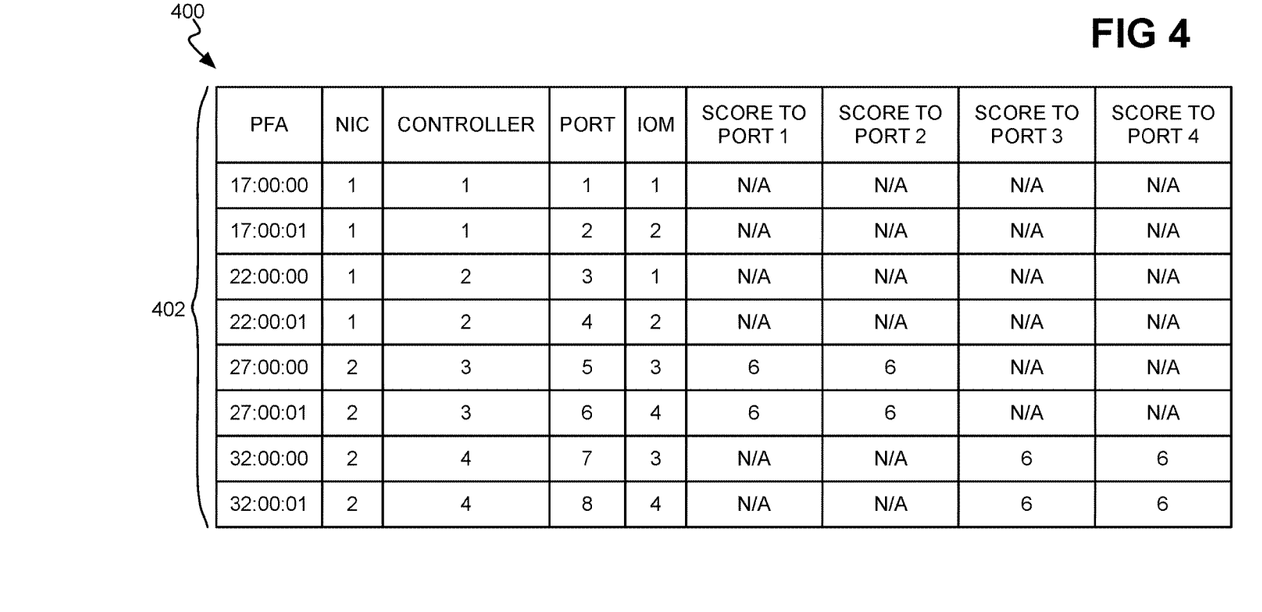

FIG. 4 shows a table 400 illustrative of example performance of parts 202 and 206 of the method 200 in relation to a computing device having four IOMs and two NICs that each have four ports and two controllers. The rows 402 of the table 400 correspond to the eight total ports, which are numbered 1, 2, 3, 4, 5, 6, 7, and 8. Four NIC teaming pairs are desired to be configured, one for each of ports 1 through 4. The candidate ports for each of ports 1 and 2 are ports 5 and 6, because they have a PFA bus number of 27, which is equal to the PFA bus number of 17 of ports 1 and 2 plus five times the number of NICs (two) in the computing device. Similarly, the candidate ports for each of ports 3 and 4 are ports 7 and 8.

In relation to port 1 as the target device, the priority score of each of ports 5 and 6 is six, because they have different IOMs, NICs, and controllers, so when performing parts 210, 212, and 214, three is added in part 210, two is added in part 212, and one is added in part 214. Since more than one candidate port has the highest priority score, port 5 is selected, because it has the same PFA function number (00) as port 1. Therefore, a NIC teaming pair including ports 1 and 5 is configured.

In relation to port 2 as the target device, the priority score of each of ports 5 and 6 is also six, because they have different IOMs, NICs, and controllers, so when performing parts 210, 212, and 214, three is added in part 210, two in part 212, and one in part 214. Since more than one candidate port has the highest priority score, port 6 is selected, because it has the same PFA function number (01) as port 2. A NIC teaming pair including ports 2 and 6 is thus configured.

In relation to each of ports 3 and 4 as the target device, the priority score of each of ports 7 and 8 is six, because neither port 7 nor port 8 shares an IOM, NIC, or controller with either port 7 or 8. Since more than one candidate port has the highest priority score for each of ports 3 and 4, port 7 is selected for port 3 since ports 3 and 7 have the same PFA function number (00), and port 8 is selected for port 4 since ports 4 and 8 have the same PFA function number (01). A NIC teaming pair including ports 3 and 7 is configured, and a NIC teaming pair including ports 4 and 8 is configured.

Figure 5:
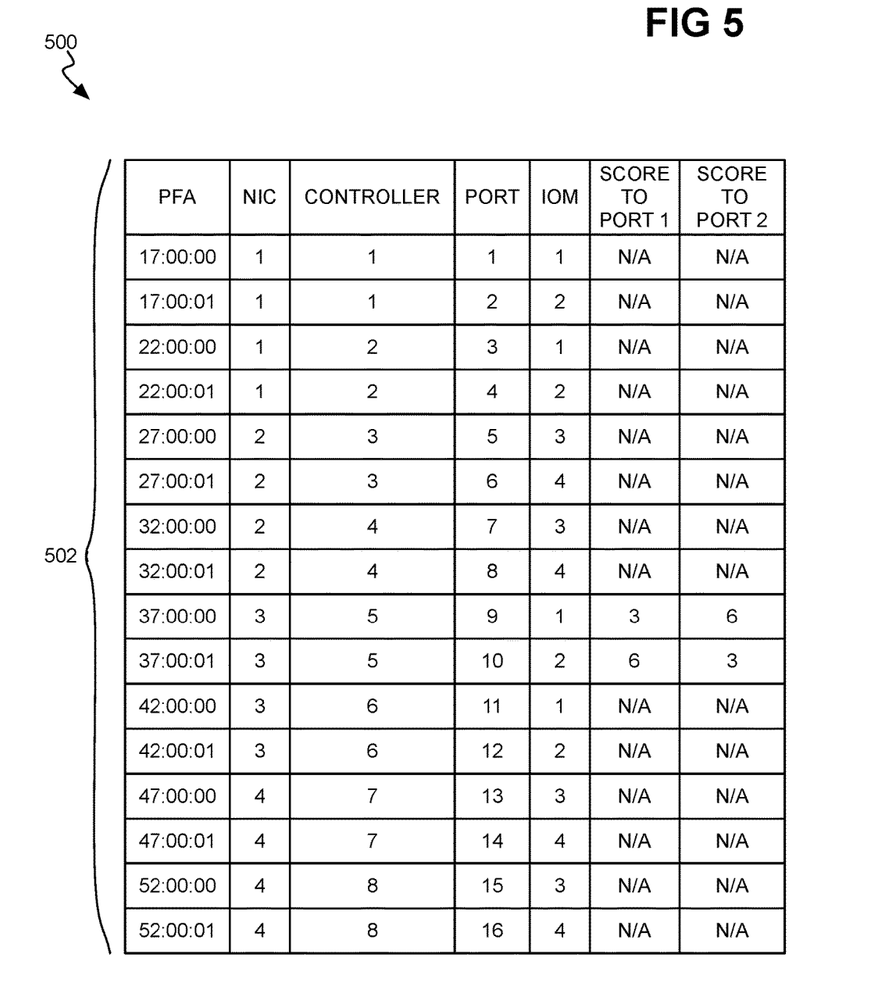

FIG. 5 shows a table illustrative of example performance of parts 202 and 206 of the method 200 in relation to a computing device having four IOMs and four NICs that each have four ports and two controllers. The rows 502 of the table 500 correspond to the sixteen total ports, which are numbered 1 through 16. Two NIC teaming pairs are desired to be configured, one including port 1, and another including port 2. The candidate ports for each of ports 1 and 2 are ports 9 and 10, because they have a PFA bus number of 37, which is equal to the PFA bus number of 17 of ports 1 and 2 plus five times the number of NICs (four) in the computing device.

In relation to port 1 as the target port, the priority score of port 9 is three, because they share the same IOM but have different controllers and NICs, so when performing parts 210, 212, and 214, two is added in part 212 and one is added in part 214. In relation to port 1 as the target port, the priority score of port 10 is six, because they have different IOMs, controllers, and NICs, so when performing parts 210, 212, and 214, three is added in part 210, two in part 212, and one in part 214. Therefore, port 10 is the selected candidate port for port 1, with which to configure a NIC teaming pair.

In relation to port 2 as the target port, the priority score of port 9 is six, because they have different IOMs, controllers, and NICs, so when performing parts 210, 212, and 214, three is added in part 210, two in part 212, and one in part 214. In relation to port 2 as the target port, the priority score of port 10 is three, because they share the same IOM but have different controllers and NICs, so when performing parts 210, 212, and 214, two is added in part 212 and one is added in part 214. Therefore, port 9 is the selected candidate port for port 2, with which to configure a NIC teaming pair.

Figure 6:
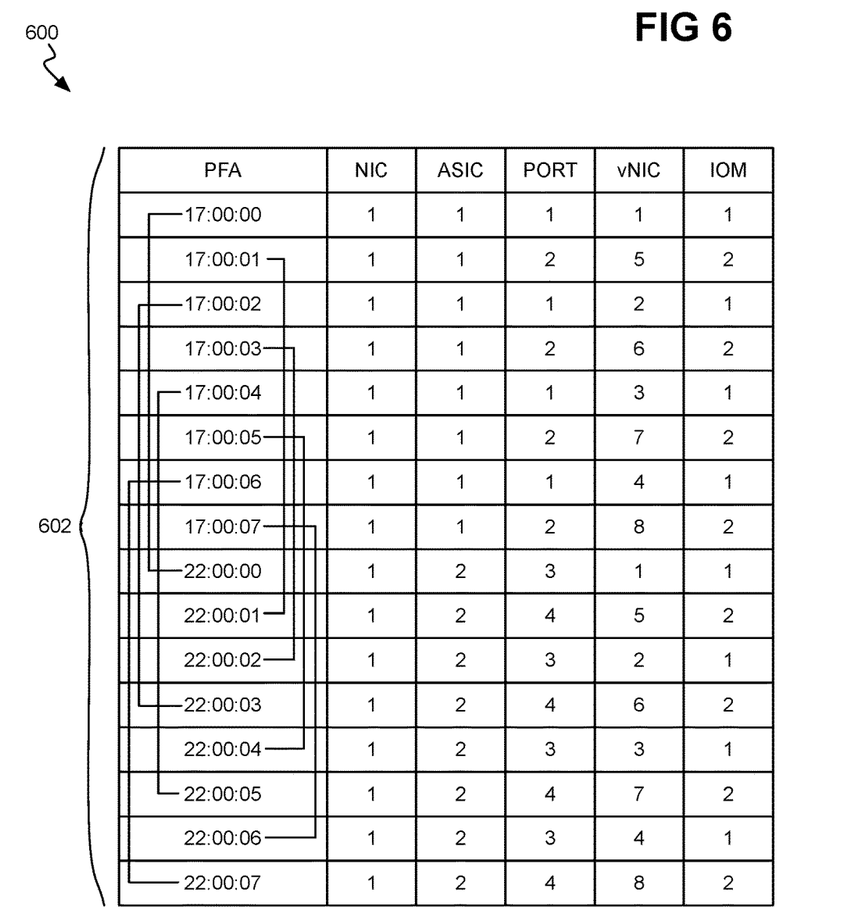

FIG. 6 shows a table illustrative example performance of the method 200 in relation to a computing device having two IOMs and one NIC that has four ports and two controllers. The rows 602 of the table 600 correspond to virtual ports of the NIC, which are referred to as vNICs. Each port is virtualized as four vNICs, and eight NIC teaming pairs are desired to be configured, where the virtual ports of each NIC teaming pair have the same vNIC number.

Parts 202 and 206 of the method 200 are first performed for the first virtual port, having a PFA of 17:00:00, which results in a NIC teaming pair with the virtual port with the PFA 22:00:01. The virtual ports having PFAs 17:00:02, 17:00:04, and 17:00:06 are then paired per parts 224 and 228 within NIC teaming pairs with the virtual ports having PFAs 22:00:03, 22:00:05, and 22:00:07, respectively. When the method 200 is then performed for the second virtual port, having a PFA of 17:00:01, this results in a NIC teaming pair with the virtual port with the PFA 22:00:00 in parts 202 and 206. The virtual ports having PFAs 17:00:03, 17:00:05, and 17:00:07 are then paired per parts 224 and 230 within NIC teaming pairs with the virtual ports having PFAs 22:00:02, 22:00:04, and 22:00:06, respectively.

Figure 7:
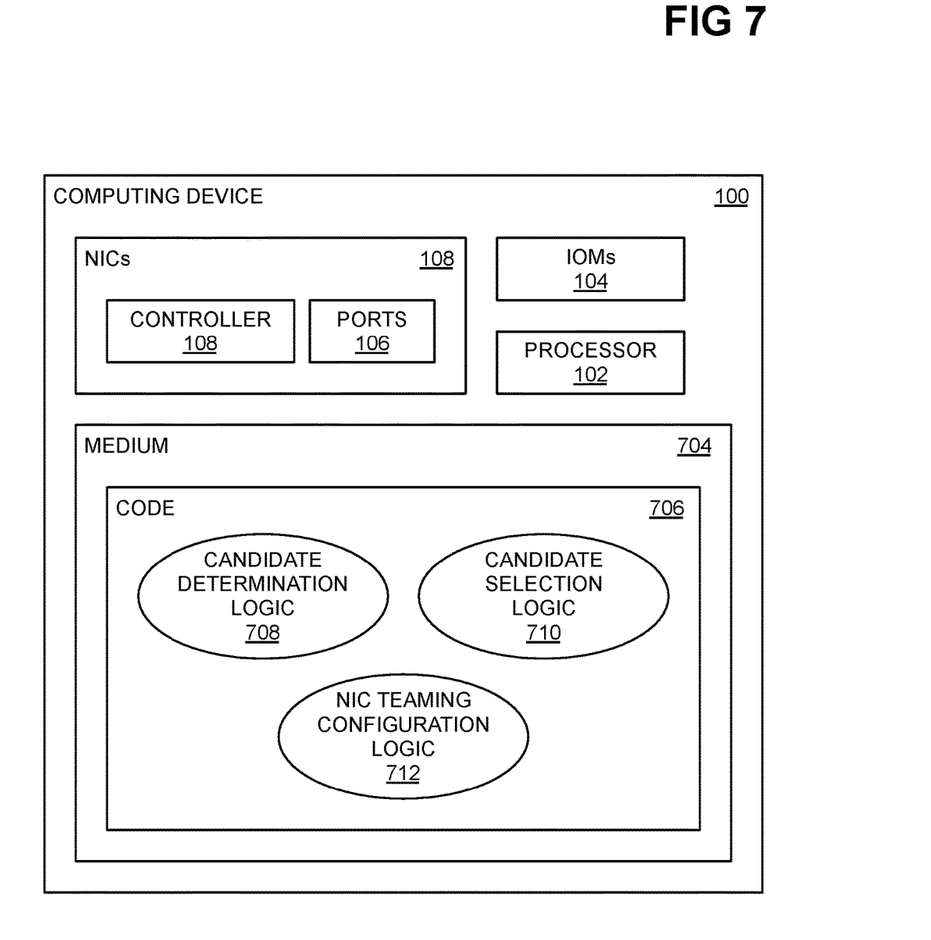
FIG. 7 is another diagram of an example computing device having network ports that can be configured as NIC teaming pairs.

FIG. 7 shows the example computing device. As in FIG. 1, the computing device 100 includes one or more NICs 102 and IOMs 104. The NICs 102 include the network ports 106 and the controllers 108. The computing device 100 includes a processor 702 and a non-transitory computer-readable data storage medium 704 that stores computer-executable code 706. The processor 702 executes the code 706 to cause various logic 708, 710, and 712 to performed or realized. That is, the code 706 implements the logic 708, 710, and 712.

The candidate determination logic 708 determines, for a target port, candidate ports with which to establish a NIC teaming pair, based on the addresses of the ports. As such, the logic 708 performs part 202 of the method 200. The candidate selection logic 710 chooses a selected candidate port for the target port, from the candidate ports that have been determined, based on priority scores of the candidate ports. The logic 710 thus performs part 206 of the method 200. The NIC teaming configuration logic 712 configures the target port together with the selected candidate port as the NIC teaming pair. The logic 712 thus performs part 220 of the method 200. The logic 712 may also perform the parts of the method 200 depicted in FIG. 2B.

The techniques that have been described thus can optimally identify the candidate ports with which a target port may be potentially configured as a NIC teaming pair. One of the candidate ports is selected to configure with the target port as the NIC teaming pair to prioritize redundancy of the hardware components of a computing device in a desired manner, such as prioritizing redundancy at the IOM level over redundancy at the NIC level, and redundancy at the NIC level over redundancy at the controller or ASIC level. The NIC teaming pairs may further be configured to provide for a multiple-channel configuration.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:

1. A method comprising:
   determining, by a computing device for a target port of a plurality of network ports of the computing device, a plurality of candidate ports of the network ports with which to establish a network interface controller (NIC) teaming pair, based on addresses of the network ports;
   determining, by the computing device for the target port, a selected candidate port with which to establish the NIC teaming pair, from the candidate ports, based on a priority score of each candidate port calculated based on the address of the candidate port; and
   configuring, by the computing device, the target port with the selected candidate port as the NIC teaming pair, network communication subsequently occurring over the target port and the selected candidate port as the NIC teaming pair.

2. The method of claim 1, wherein determining, for the target port, the candidate ports with which to establish the NIC teaming pair, based on the addresses of the network ports, comprises:
   determining a target bus number of the candidate ports from a bus number of the target port and a multiple of a number of the NICs of the computing device.

3. The method of claim 2, wherein determining the target bus number of the candidate ports comprises:
   determining the target bus number of the candidate ports equal to the bus number of the target port plus the multiple of the number of the NICs of the computing device.

4. The method of claim 3, wherein determining the target bus number of the candidate ports comprises:
   determining the target bus number of the candidate ports equal to the bus number of the target port plus five times the number of the NICs of the computing device.

5. The method of claim 1, wherein each NIC has a plurality of controllers, each network port of each NIC is managed by one of the controllers of the NIC, and the address of each network port is a peripheral component interconnect (PCI) function address (PFA) of the network port including a bus number of the NIC of which the network port is a part, a device number of the NIC of which the network port is a part, and a function number of the controller that manages the network port.

6. The method of claim 5, wherein the controllers of each NIC are application-specific integrated circuits (ASICs).

7. The method of claim 1, wherein each NIC has a plurality of controllers, each network port of each NIC is managed by one of the controllers of the NIC, the computing device has one or more input/output modules (IOMs) to which the NICs are externally exposed, and each network port is connected to one of the IOMs, and wherein determining, for the target port, the selected candidate port with which to establish the NIC teaming pair, from the candidate ports, based on the priority score of each candidate port comprises, for each candidate port:
   adding a first value to the priority score of the candidate port just if the IOM to which the target port is connected is different than the IOM to which the candidate port is connected;
   adding a second value to the priority score of the candidate port just if the NIC of which the target port is a part is different than the NIC of which the candidate port is a part; and
   adding a third value to the priority score of the candidate port just if the controller that manages the target port is different than the controller that manages the candidate port.

8. The method of claim 7, wherein each NIC has a plurality of controllers, each network port of each NIC is managed by one of the controllers of the NIC, the computing device has one or more input/output modules (IOMs) to which the NICs are externally exposed, and each network port is connected to one of the IOMs,
   and wherein the first value is greater than the second value, and the second value is greater than the first value, to prioritize redundancy in determination of the selected candidate port at an IOM level over a NIC level, and at the NIC level over a controller level.

9. The method of claim 1, wherein determining, for the target port, the selected candidate port with which to establish the NIC teaming pair, from the candidate ports, based on the priority score of each candidate port comprises:
   if just one of the candidate ports has a highest priority score, choosing the candidate port having the highest priority score as the selected candidate port; and
   if more than one of the candidate ports each have the highest priority score, choosing the candidate port having the highest priority score and having a same function number as the target port, as the selected candidate port.

10. The method of claim 1, wherein further comprising:
    if the target port is to be part of a multiple-channel configuration, determining, by the computing device, a difference between an effective value of the address of the selected candidate port and an effective value of the address of the target port;
    if a function number of the address of the target port is non-odd, configuring, by the computing device, NIC teaming pairs for a plurality of remaining ports that each have an address with a non-odd function number and with a bus number equal to a bus number of the address of the target port; and if the function number of the address of the target port is odd, configuring, by the computing device, NIC teaming pairs for a plurality of remaining ports that each have an address with an odd function number and with a bus number equal to the bus number of the address of the target port.

11. The method of claim 1, wherein each NIC has a plurality of controllers, each network port of each NIC is managed by one of the controllers of the NIC, the computing device has one or more input/output modules (IOMs) to which the NICs are externally exposed, and each network port is connected to one of the IOMs, and wherein the method further comprises:

determining, by the computing device, a selected mode of the NIC teaming pair based on a configuration of a switch to which the network ports are connected via the IOM; and configuring the NIC teaming pair to operate in the selected mode.

12. A computing device comprising:

one or more network interface controllers (NICs), each NIC having a plurality of network ports;

a processor;

a non-transitory computer-readable data storage medium storing computer-executable code that is executable by the processor to realize:

candidate determination logic to, for a target port of the network ports of the NICs, determine a plurality of candidate ports of the network ports of the NICs with which to establish a NIC teaming pair, based on addresses of the network ports;

candidate selection logic to, for the target port, choose a selected candidate port with which to establish the NIC teaming pair, from the candidate ports, based on a priority score of each candidate port calculated based on the address of the candidate port; and NIC teaming configuration logic to configure the target port with the selected candidate port as the NIC teaming pair.

13. The computing device of claim 12, wherein the candidate determination logic is to, for the target port, determine the candidate ports by:

determining a target bus number of the candidate ports equal to a bus number of the target port plus a multiple of a number of the NICs.

14. The computing device of claim 12, wherein each NIC has a plurality of controllers, each network port of each NIC is managed by one of the controllers of the NIC, and the address of each port is a peripheral component interconnect (PCI) function address (PFA) of the network port including a bus number of the NIC of which the network port is a part, a device number of the NIC of which the network port is a part, and a function number of the controller that manages the network port.

15. The computing device of claim 12, wherein each NIC has a plurality of controllers, each network port of each NIC is managed by one of the controllers of the NIC, the computing device has one or more input/output modules (IOMs) to which the NICs are externally exposed, and each network port is connected to one of the IOMs, and wherein the candidate selection logic is to choose the selected candidate port from the candidate ports by, for each candidate port:

adding a first value to the priority score of the candidate port just if the TOM to which the target port is connected is different than the IOM to which the candidate port is connected;

adding a second value to the priority score of the candidate port just if the NIC of which the target port is a part is different than the NIC of which the candidate port is a part;

adding a third value to the priority score of the candidate port just if the controller that manages the target port is different than the controller that manages the candidate port, wherein the first value is greater than the second value, and the second value is greater than the first value, to prioritize redundancy in determination of the selected candidate port at an IOM level over a NIC level, and at the NIC level over a controller level;

if just one of the candidate ports has a highest priority score, choosing the candidate port having the highest priority score as the selected candidate port; and if more than one of the candidate ports each have the highest priority score, choosing the candidate port having the highest priority score and having a same function number as the target port, as the selected candidate port.

16. A non-transitory computer-readable data storage medium storing computer-executable code executable by a computing device to perform a method comprising:

determining, for a target port of a plurality of ports of one or more network interface controllers (NICs) of the computing device, a plurality of candidate ports of the ports with which to establish a NIC teaming pair, each candidate port having a target bus number equal to a bus number of the target port plus a multiple of a number of the NICs, wherein the computing device has one or more input/output modules (IOMs) to which the NICs are externally exposed, each NIC has a plurality of controllers, and each port of each NIC is managed by one of the controllers of the NIC and is connected to one of the IOMs of the computing device;

determining, by the computing device for the target port, a selected candidate port with which to establish the NIC teaming pair, from the candidate ports, based on a priority score of each candidate port calculated based on the TOM to which the candidate port is connected, the NIC of which the candidate port is a part, and the controller that manages the candidate port, wherein the priority scores prioritize redundancy in determination of the selected candidate port at an IOM level over a NIC level, and at the NIC level over a controller level; and configuring, by the computing device, the target port with the selected candidate port as the NIC teaming pair, network communication subsequently occurring over the target port and the selected candidate port as the NIC teaming pair.

17. The non-transitory computer-readable data storage medium of claim 16, wherein the address of each port is a peripheral component interconnect (PCI) function address (PFA) of the port including a bus number of the NIC of which the port is a part, a device number of the NIC of which the port is a part, and a function number of the controller that manages the port.

* * * * *